US008286456B2

(12) United States Patent
Coates (10) Patent No.: US 8,286,456 B2
(45) Date of Patent: Oct. 16, 2012

(54) APPARATUS AND METHOD FOR MANUFACTURING METAL CONTAINERS

(75) Inventor: Michael Jonathan Coates, Yorkshire (GB)

(73) Assignee: Crown Packaging Technology, Inc., Alsip, IL (US)

( * ) Notice: Subject to any disclaimer, the term of this patent is extended or adjusted under 35 U.S.C. 154(b) by 55 days.

(21) Appl. No.: 12/865,302

(22) PCT Filed: Jan. 22, 2009

(86) PCT No.: PCT/EP2009/050705
§ 371 (c)(1),
(2), (4) Date: Jul. 29, 2010

(87) PCT Pub. No.: WO2009/100972
PCT Pub. Date: Aug. 20, 2009

(65) Prior Publication Data
US 2010/0311556 A1 Dec. 9, 2010

(30) Foreign Application Priority Data

Feb. 14, 2008 (EP) .................................. 08151411

(51) Int. Cl.
*B21D 51/00* (2006.01)
(52) U.S. Cl. ............................................. 72/94
(58) Field of Classification Search ....... 72/94; 198/418
See application file for complete search history.

(56) References Cited

U.S. PATENT DOCUMENTS

| 4,030,432 | A | * | 6/1977 | Miller et al. | 413/69 |
| 4,280,353 | A | * | 7/1981 | Murphy | 72/345 |
| 4,697,691 | A | * | 10/1987 | Zodrow et al. | 198/426 |
| 5,282,375 | A | * | 2/1994 | Lee et al. | 72/4 |
| 5,832,769 | A | * | 11/1998 | Schultz | 72/352 |
| 2003/0084696 | A1 | * | 5/2003 | Bowlin | 72/94 |

FOREIGN PATENT DOCUMENTS

| EP | 1308225 B1 | 1/2007 |
| EP | 1828035 | 9/2007 |
| WO | WO 2006/067207 | 6/2006 |
| WO | WO 2009/100972 | 8/2009 |

* cited by examiner

*Primary Examiner* — Faye Francis
(74) *Attorney, Agent, or Firm* — Woodcock Washburn LLP (57) ABSTRACT

An apparatus and method for transferring compressed air between machine elements uses a rotary manifold (110) in which an orifice restrictor (140) is provided between the air supply (115), between each piston (125) and shoe (130). The orifice restrictors (140) meter volumetric flow rate during loading and/or unloading cans from the apparatus, thereby optimised compressed air consumption.

4 Claims, 8 Drawing Sheets

APPARATUS AND METHOD FOR MANUFACTURING METAL CONTAINERS

CROSS-REFERENCE TO RELATED APPLICATIONS

This application is the National Stage of International Application No. PCT/EP2009/050705 filed Jan. 22, 2009, which claims the benefit of EP application number 08151411.9 filed Feb. 14, 2008, the disclosures of which are incorporated herein by reference in their entirety.

TECHNICAL FIELD

This invention relates to the manufacture of metal cans and in particular to a method and apparatus for transferring compressed air and/or vacuum between machine elements.

BACKGROUND ART

It is generally necessary to carry out can making in a series of separate process stages which often require different tooling. Whilst this was once achieved on an in-line conveyor system, it is now more common practice to use a series of rotating circular turrets.

U.S. Pat. No. 5,282,375 (REYNOLDS METAL COMPANY) describes a handling system for necking the open end of a metal container body, or can. The can bodies are supported on the periphery of a circular turret by means of a negative pressure, also referred to as 'suction vacuum' or simply 'vacuum'. For consistency, that terminology is also adopted herein. A vacuum manifold arrangement supplies high volume low suction vacuum to a small number of locations in the vicinity of the infeed location rapidly to locate container bodies on base pads. A low volume high suction vacuum supply to the downstream spindles ensures proper clamping suction to maintain containers on the base pads during necking.

Rotary manifolds in various forms have been used for many years for the supply of compressed air to tooling. Typically, air galleries selectively communicate with supply through circumferentially equi-spaced holes in a rotating disc and slots in a stationary shoe. The air manifold of EP 1308225 B (DELAWARE CAPITAL FORMATION) uses both high pressure and low pressure recycled air. High and/or low pressure air is bled from a container so as to be re-used. This bleed back process is said to recoup about 50% of the air volume. However, the bleed back process is dependent on the effectiveness of seal between manifold and rotor. Back pressure on the pistons which are used to achieve this seal is limited to ports which are in a dead head circuit, i.e. a can sealed on the knockout. This occurs over a very small arc of the manifold. There are springs adjacent to the piston chambers which press the manifold against the rotor if no cans are present. When there is no can present, there is no dead head circuit and the springs are fairly inefficient on their own.

EP 1828035 A (CROWN PACKAGING TECHNOLOGY, INC) describes a transfer mechanism for a multi-stage die necking station. The transfer device uses conventional turrets having 3 zones, each carrying out one stage of multi-stage die necking. After completing each stage, a transfer wheel removes the can from the pocket for that stage and transfers it to the pocket for the next stage. Alternatively, the can may be transferred to a separate turret if further process stages are required. This application uses pockets to support cans around the periphery of a turret but it also suggests that this support could be achieved by suction pads.

Loading and unloading the can into the tooling using suction, vacuum and/or compressed air leads inevitably to leakage of air to the atmosphere, for example around the edges of the can and during movement of the can. As noted above with reference to EP 1308225 B (DELAWARE CAPITAL FORMATION) seals may only be achieved over a small arc of the manifold. Furthermore, this reference uses two pressure heads which require two distribution systems. This duplication of hardware consequently has substantial maintenance needs.

This invention seeks to provide a method and apparatus which overcome the problems of the prior art and which use/waste less compressed air, even in a situation when no cans are present.

DISCLOSURE OF INVENTION

According to the present invention, there is provided, an apparatus for manufacturing metal containers, including a rotary manifold for transferring air according to events in the manufacturing process, the manifold comprising a connection to one or more air supplies; and an air outlet; characterised in that the manifold is a rotary manifold which includes one or more fixed orifice restrictors.

The one or more air supplies are generally transferred to positions around the rotary manifold. Conventionally, the rotary manifold includes a seal between static and rotating machine elements. The manifold may further comprise a set of pistons, shoe and disc in which the seal is at the interface between the shoe and the disc. The shoe is usually "stationary" (non-rotating) whereas the disc is constrained through mechanical connection to rotate with the main shaft, about the main shaft axis, so as to select the desired compressed air supply to be transferred to the tooling.

In the present invention, the, or each fixed orifice restrictor is typically positioned between a piston and the shoe. There is thus a pressure drop obtained across the orifice restrictor, which therefore controls volumetric flow rate to the tooling. This pressure drop forces out the piston and in turn forces the shoe against the disc, giving a better and more positive seal than prior art rotary manifolds.

By careful selection of orifice restrictors around the rotary manifold, the rotary manifold could operate with a single compressed air supply and avoid the need for multiple pressure heads.

According to a further aspect of the present invention, there is provided a method of manufacturing metal containers, the method comprising: controlling transfer of compressed air between machine elements; and timing transfer of air according to events in manufacturing process; characterised by: timing events in the container manufacture requiring compressed air; controlling volumetric air flow rate during loading and/or unloading a container from a process machine; and creating a force at an interface between machine elements to create a seal.

The method may use a single air supply, or more than one supply, all being at the same pressure.

The method usually comprises transferring air from static machine elements across to rotating machine elements. The method may also include controlling "vacuum" between machine elements. Vacuum is not required for all shaping processes but is particularly useful for base or bottom reforming, for example.

MODE(S) FOR CARRYING OUT THE INVENTION

Figure 1:
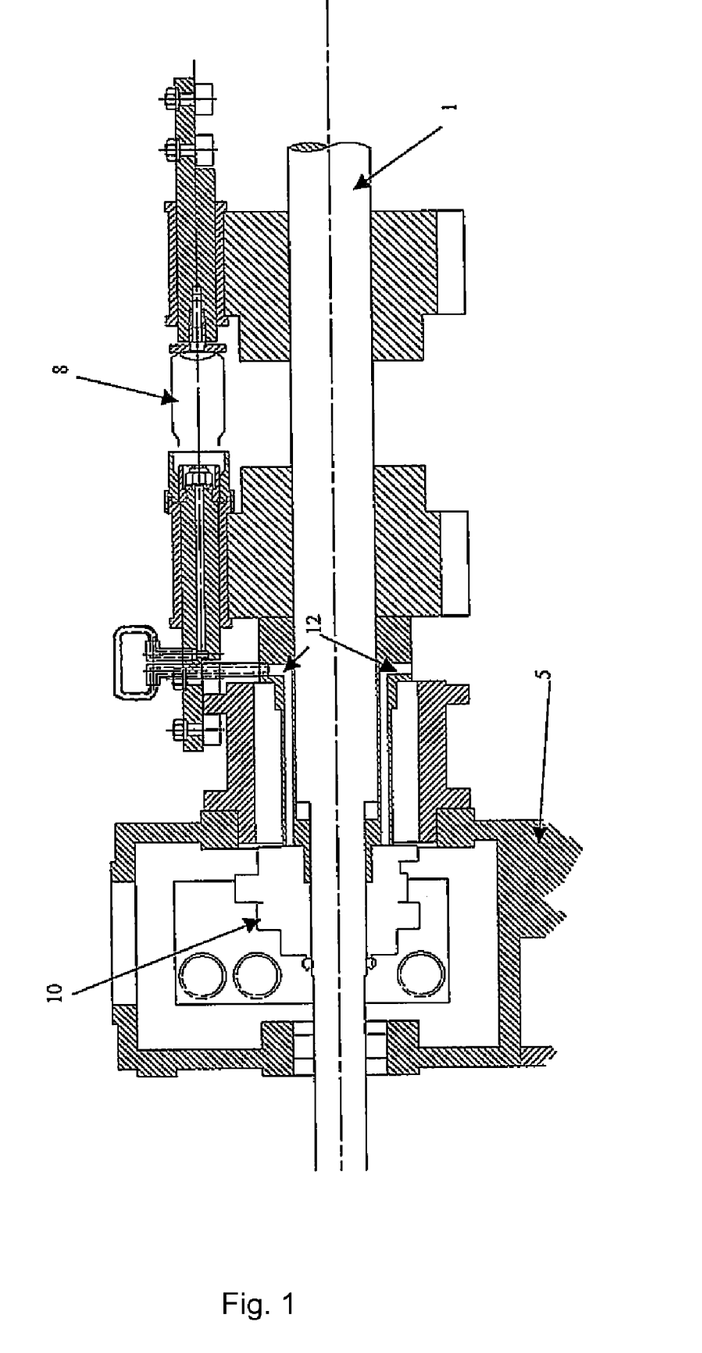
FIG. 1 is a schematic side view of prior art machine.

FIG. 1 is a schematic side view of a part of a typical can making machine showing a rotating main shaft assembly 1 and a static machine frame 5. A can body 8 with integral base, such as is used for beverage cans is shown in its position for processing. On the left hand side of FIG. 1 a rotary manifold 10 is mounted. The rotary manifold (also referred to as a rotary valve herein) is the means of transferring compressed air and vacuum from static machine elements across to galleries 12 of rotating machine elements, and timing the air/vacuum events for the can making process.

Figure 2:
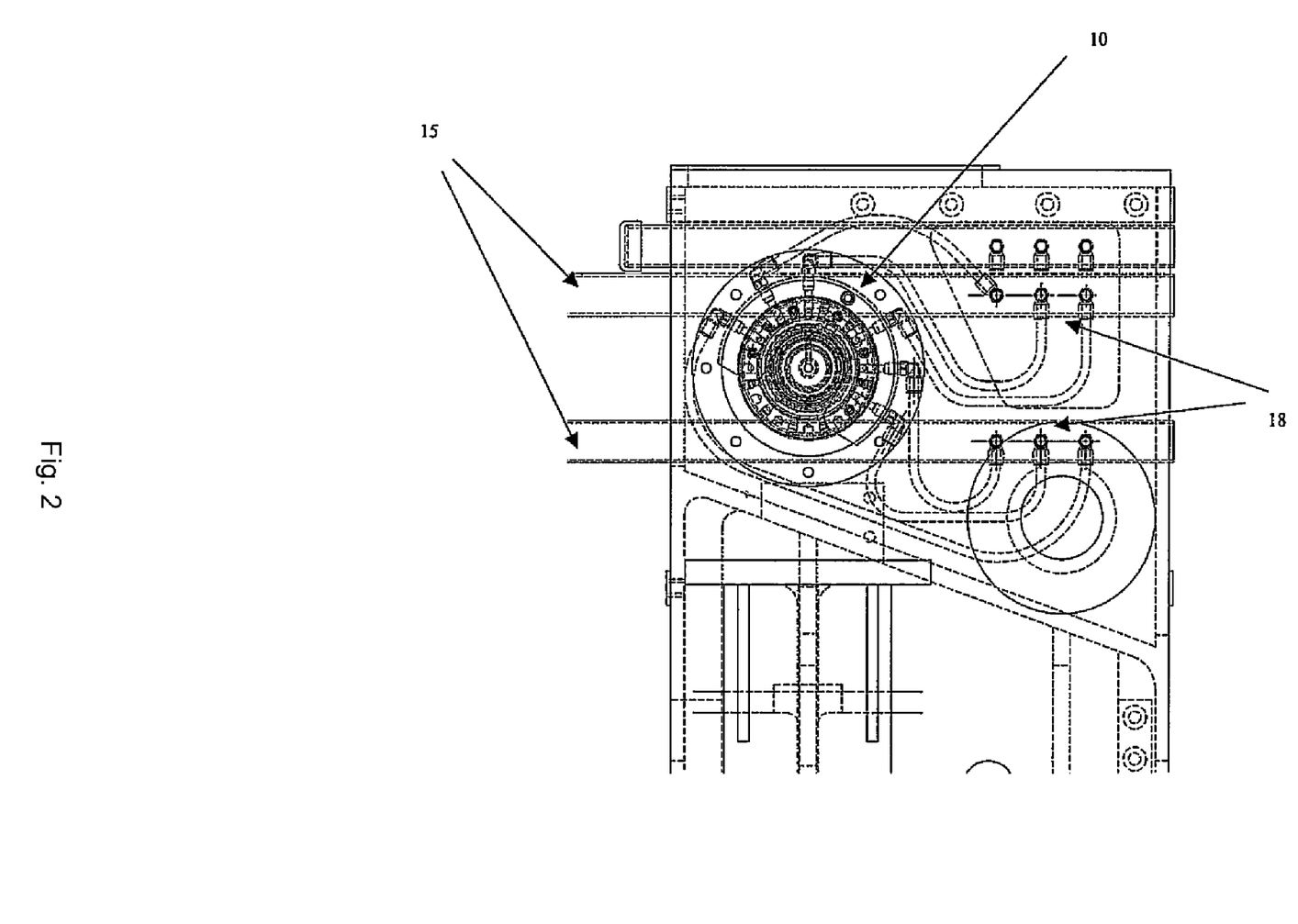
FIG. 2 is a schematic end view of the prior art rotary manifold of FIG. 1.

The end view of the rotary manifold 10 shown in FIG. 2 shows two compressed air supplies 15, also known as pressure heads, usually one 'low' pressure of 5 to 15 psi and one higher pressure of 20 to 50 psi. The rotary manifold receives air at the desired high or low pressure across via ports 18 from the relevant compressed air supply lines.

Figure 3:
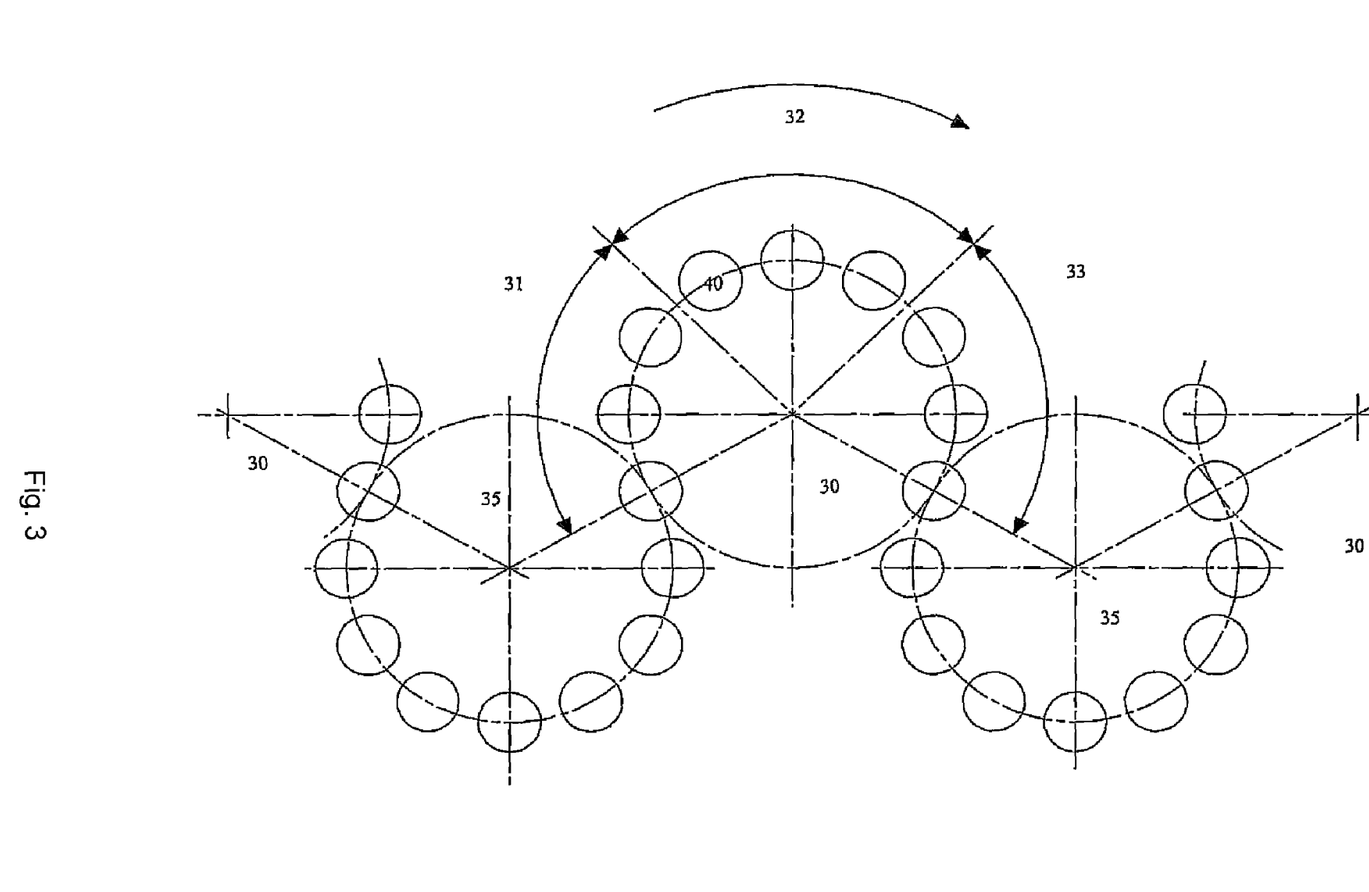
FIG. 3 is a schematic view of a typical can process.

FIG. 3 is a schematic view showing how cans are transported through a machine from one process turret 30 to the next using transfer turrets 35. Pockets for cans are shown as small circles 40, with the turrets being denoted by large circles. The central process turret 30 has a first sector 31 for loading each can into the tooling, a second process sector 32 and a final sector 33 for unloading the can from the tooling. Rotation of that central turret is shown as being clockwise. It follows therefore that adjacent transfer turret rotation is anti-clockwise.

Figure 4:
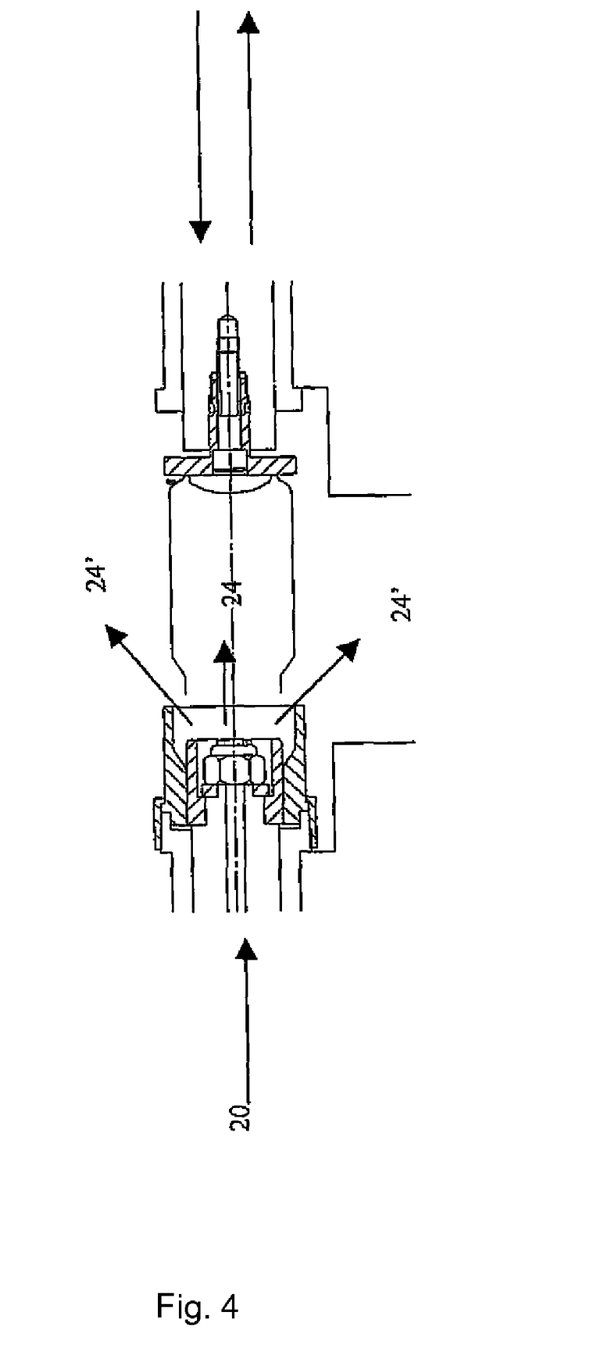
FIG. 4 is a side view of air supply to a can during a known process.
Figure 5:
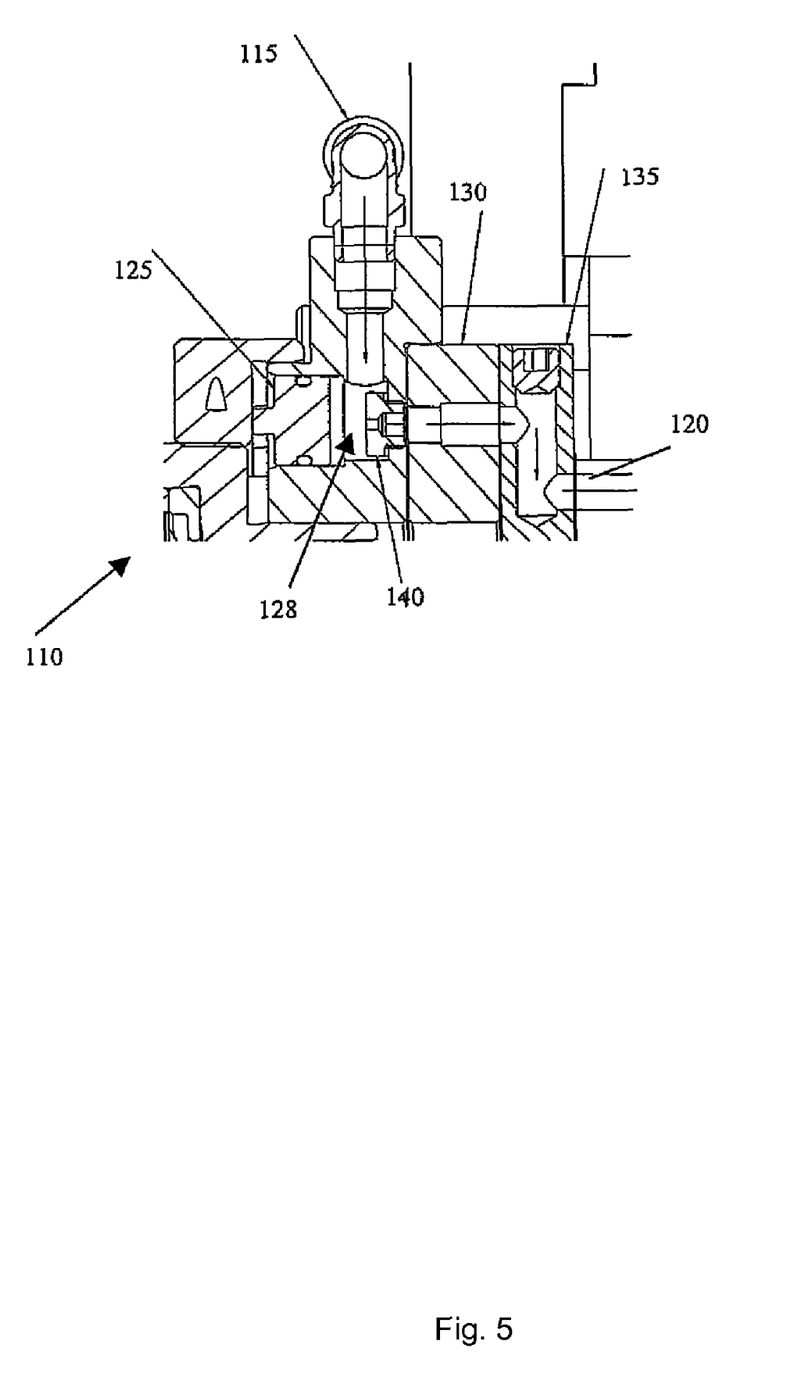
FIG. 5 is a schematic side view of the rotary manifold of the invention.

During the loading/unloading phases 31 and 33, air is blown into the can and, wastefully, into the atmosphere as shown schematically by the arrows in FIG. 4. Due to high production speeds, there is not enough process time available to switch the air supply off during loading. Cans move axially towards or away from the compressed air gallery 20 during loading or unloading respectively (see arrows in right of FIG. 4) and at high machine production speeds this means that compressed air 24 which is blown towards the can body also escapes to the atmosphere 24'. This waste of compressed air is particularly significant when there is no can present. During processing of the can, the can is pressurised and there is a seal between the tooling and the can so that air leakage is minimised.

FIGS. 5 to 8 are views of the rotary manifold 110 of the invention, which is used to select air/vacuum events required for manufacture of can bodies having an integral base. Examples of when air/vacuum requires control are processes for "shaping" of the can body. Shaping at the open end of the can body could include 'necking' or reduction in can body diameter which is a standard technique to enable a smaller can end of thicker, and therefore more costly material than that of the can body, to be joined to the can body by a double seam. The processing forces involved in this neck formation need to be resisted by high pressure compressed air which is used to stiffen the can. Lower pressure compressed air is also used to move the can away from the tooling into position for collection by a transfer turret.

Another "shaping" technique is reforming the base or bottom of a can body to improve its strength, such as to increase the pressure at which the central dome in the base might reverse. Compressed air is used to stiffen the can whilst holding it against a pad. Vacuum is then required to move the can away from the tooling into position for collection by a transfer turret.

Air is supplied from an air inlet 115 to a region 128 between piston 125 and shoe 130. The novel feature of the rotary valve of the invention is the addition of orifice restrictors 140, which are on stationary backplate 132 on which the shoe 130 is mounted, and extend within region 128. By incorporating these orifice restrictors, the applicant has found that volumetric air flow can be controlled. In order to reduce loss of pressurised air to the environment during loading or unloading a can from a process turret, volumetric air flow rate from the outlet 120 can be metered by the orifice restrictor and rotational position of the rotary manifold. In known machines, complex recycling or bleed-back processes have been necessary to compensate for what would otherwise involve excessive wastage of compressed air.

In the example of FIGS. 5 to 8 the rotary valve 110 has compressed air supply inlets 115, at high and low pressures respectively, which are used to provide controlled volumetric air flow 120 to the tooling, and a vacuum supply. The pressure drop across the fixed orifice restrictor 140 gives a higher pressure in region 128 than simply air flowing at 120. Hence there is a net gain in force at piston 125 which acts on shoe 130, pressing the shoe against rotatable disc 135. This force presses the shoe against the disc without the need to have a can sealed on the tooling to create a dead end on the system. Air exits the manifold 110 at outlets 120 according to the compressed air supply requirements and rotational position of the rotary valve.

Figure 6:
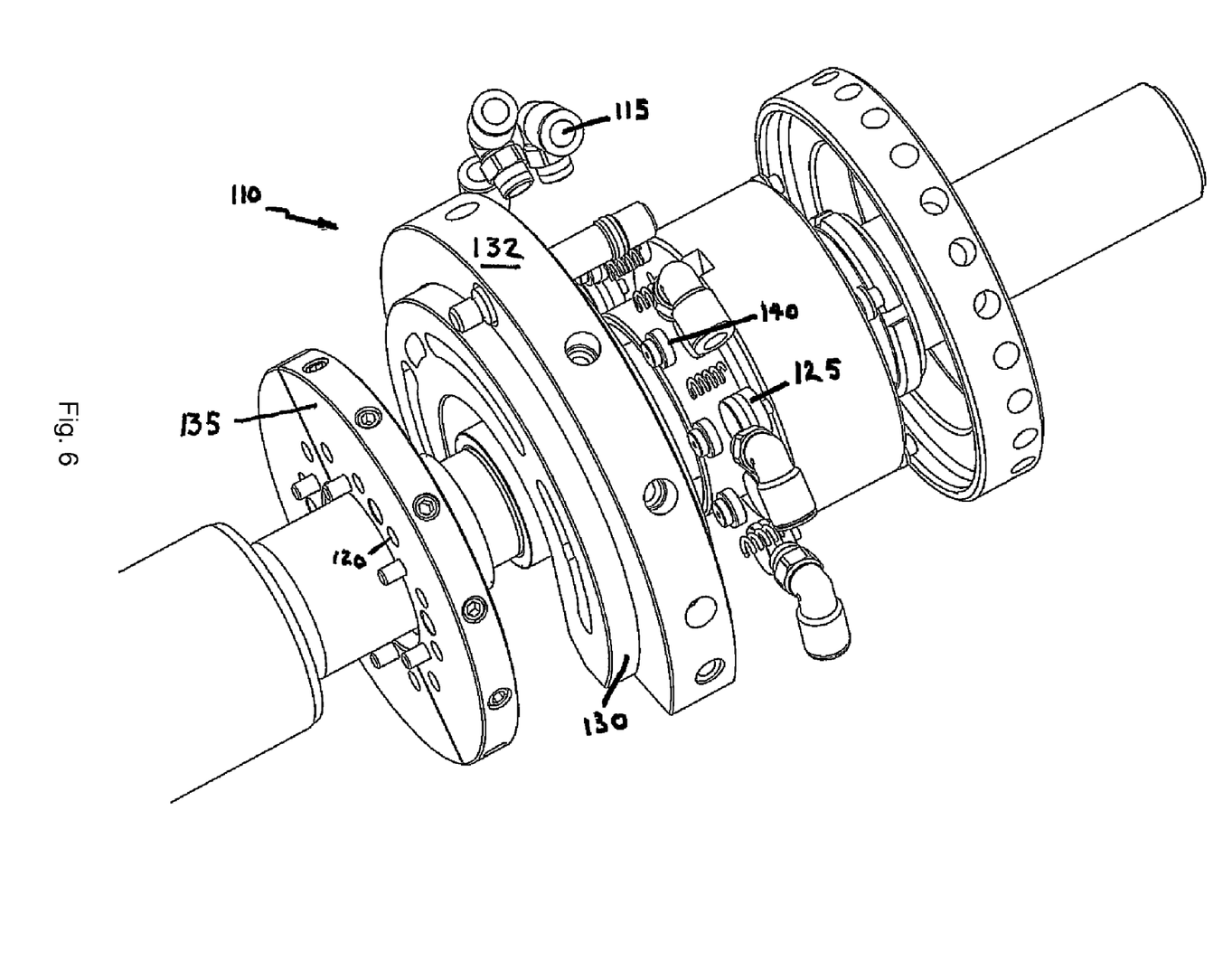
FIG. 6 is an exploded perspective view of the rotary manifold of FIG. 5.
Figure 7:
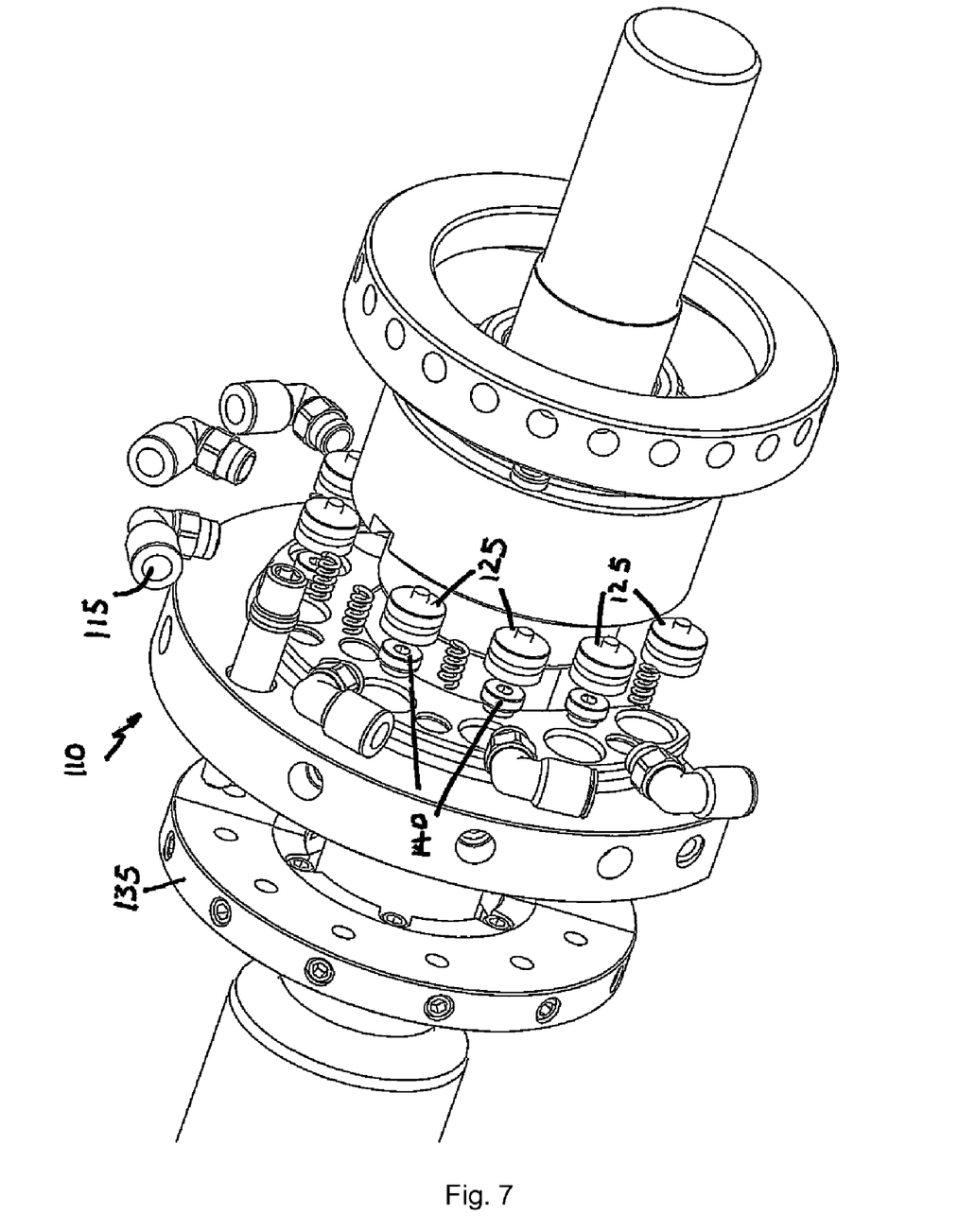
FIG. 7 is an exploded perspective view of the rotary manifold of FIG. 5.
Figure 8:
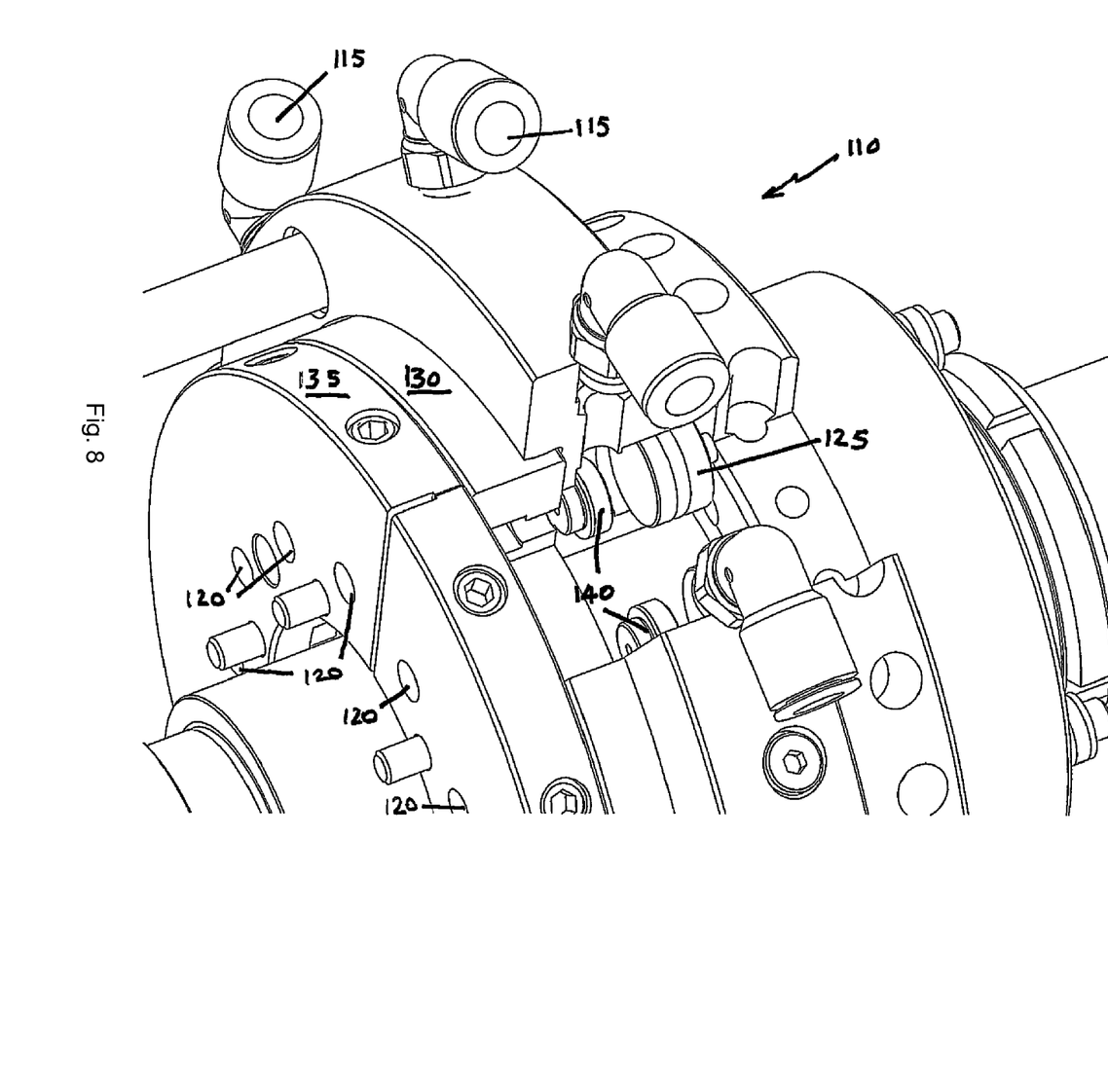
FIG. 8 is a partial view of the rotary manifold of FIG. 5, cut away to show an orifice restrictor in its operating position.

In FIG. 6, the backplate 132 and components mounted on the backplate are "stationary" and the disc 135 rotates about the main shaft axis. Thus not only the backplate but also the air inlet 115, pistons 125, shoe 130 and orifice restrictors are "stationary", i.e. they do not rotate about the axis of the main shaft, although clearly there is movement or piston and shoe to press against the rotating disc 135.

In another embodiment of the invention (not shown), the rotary manifold is supplied with a single pressure head of about 20 to 50 psi. The diameter of the outlet hole depends on the orifice restrictor but low or high pressure is selected by individual restrictors for each piston. For example, if the single pressure head were about 50 psi, and the system requires 30 psi, the orifice restrictor is used to give the required volume and pressure. In essence, the smaller diameter outlet, the higher the pressure drop through the restrictor and reduced volumetric flow rate.

The invention claimed is:

1. An apparatus for manufacturing metal containers, including a rotary manifold for transferring air according to events in the manufacturing process, the manifold comprising:

a connection to one or more air supplies;

an air outlet;

one or more fixed orifice restrictors;

a seal between static and rotating machine elements; and at least one piston, a shoe, and a disc in which the seal is at the interface between the shoe and the disc, and the one or more orifice restrictors is/are positioned between the piston and the shoe.

2. An apparatus for manufacturing metal containers according to claim 1 wherein the shoe is part of the static machine elements and the disc is part of the rotating machine elements.

3. An apparatus for manufacturing metal containers according to claim 1 wherein the connection to one or more air supplies is only one connection to a single air supply.

4. An apparatus for manufacturing metal containers according to claim 1 wherein the connection to one or more air supplies is two or more connections.

\* \* \* \* \*